D. D. PARMELEE.
TREATING TIN SCRAP TO OBTAIN USEFUL PRODUCTS.
No. 102,148. Patented Apr. 19, 1870.
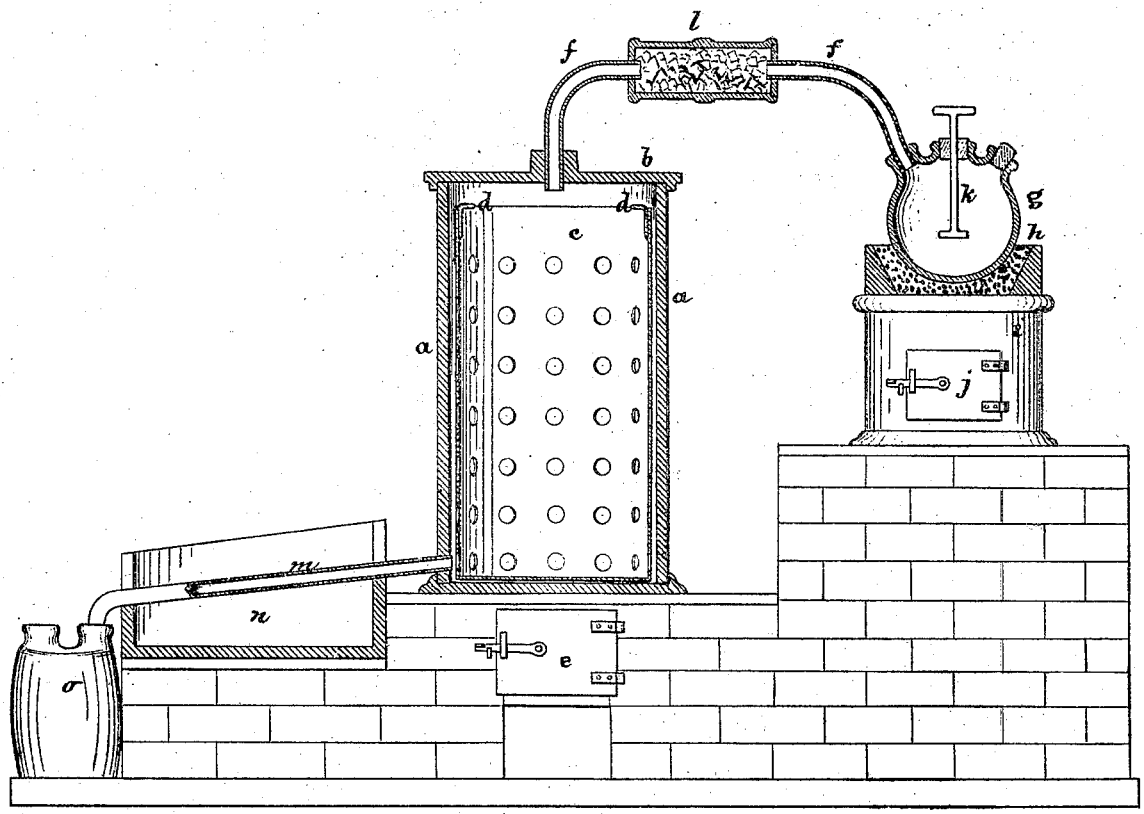

United States Patent Office.

DUBOIS D. PARMELEE, OF NEW YORK, N. Y., ASSIGNOR TO WALTER K. MARVIN.

*Letters Patent No. 102,148, dated April 19, 1870.*

---

IMPROVEMENT IN TREATING TIN SCRAP TO OBTAIN USEFUL PRODUCTS.

---

The Schedule referred to in these Letters Patent and making part of the same

---

*To whom it may concern:*

Be it known that I, DUBOIS D. PARMELEE, of the city, county, and State of New York, have invented a certain new and useful Process of, and Apparatus for, Removing and Utilizing the Tin of "Waste Tin Scraps," of which the following is a specification.

The "waste tin scraps" referred to consist of the best quality of iron-plate coated with tin in proportion to their weight, varying from two to three per cent.

The object of my invention is not only to utilize the tin, but also to obtain the scraps of iron free from tin, for the purpose of utilizing or manufacturing them into wrought-iron, cast-iron, and steel, as described in Letters Patent granted to me on the 29th day of June, 1869, numbered 91,962.

The following is a description of the process, and of a form of apparatus which is well adapted to carry out the same, and, also, of the conditions required to properly employ it.

The accompanying drawing is a side elevation, partly in section, of the apparatus.

*a* represents a cast or wrought-iron cylinder of suitable dimensions, say six feet high and three feet in diameter, having a cast-iron bottom, with a projecting flange, so as to form a steady support for the cylinder.

A lid, *b*, is also provided, formed so as to fit the cylinder tightly.

A second cylinder, *c*, is placed within and fits loosely in the outer cylinder *a*, so that it may be easily removed therefrom and replaced. This cylinder is closed at its bottom, but open at the top, where handles *d d* are attached, and is perforated with many holes in both its sides and its bottom. This portion of the apparatus rests on a brick foundation, in which, and immediately under the cylinder, is formed a fire-place, the door of which is shown at *e*.

The cylinder *a* is connected by pipe *f* with a lead flask or retort, *g*, for generating or producing chlorine gas. This retort rests in and is heated by a sand-bath, *h*, on top of an iron cylinder, *i*, which is placed upon a brick foundation, and serves to support the retort, and to form a fire-place for heating the sand-bath. The door of this fire-place is shown at *j*.

The retort is provided with a "stirrer" or agitator, *k*, for mixing the ingredients in the retort for liberating the chlorine.

The gas produced in the retort is conveyed to the cylinder *a* through the pipe *f*.

Upon the pipe *f* between the chlorine retort and the cylinder, is placed a tube of glass or other suitable material, *l*, intended to be filled with lumps of fused chloride of calcium, for the purpose of drying the gas before it reaches the cylinder or scrap-chamber *a*.

From the lower part of the cylinder *a* extends a tube, *m*, preferably made of glass, which passes through the water-tight box *n*, and connects with the receptacle or "Woulfe bottle" *o*. The box is to be filled with water, and the tube is intended to condense the vapors formed in the chamber *a*, and convey them to the receptacle *o*.

The mode of conducting the process with this apparatus is as follows:

Remove the perforated cylinder or basket *c* by any suitable hoisting apparatus, coat it, as well as the interior of the chamber *a*, with plumbago, fill the basket with tin scraps, replace it in the chamber and put on the lid *b*. The pipe *f*, which is removable, should then be adjusted to the lid, and the chloride of calcium tube *l* and the box *n* filled with water. Next charge the retort or flask *g* with three (3) parts of common salt, (chloride of sodium,) and one (1) part of peroxide of manganese, thoroughly mixed together before their introduction into the retort, and add two (2) parts of sulphuric acid, diluted with an equal weight of water. Agitate the whole together by means of the stirrer *k*.

A gentle wood fire is then made in the fire-place *e*, to heat the bottom of the chamber *a* to about 200° Fahrenheit, and a gentle fire is also made in the fire-place *j*, to warm the lead retort *g*.

The chlorine gas is then liberated, passes off through the pipe *f* and chloride-of-calcium tube *l*, where it is dried, into the chamber *a*, and, being heavier than air, descends through the tin scraps, unites with the tin coating, and forms the anhydrous bichloride of tin, which, from the heat resulting from the chemical action, is in the form of vapor. This passes off through the glass tube *m* into the "Woulfe bottle" *o*, condensing into a fluid known as "the fuming liquid of Libarius."

The operation is continued until the white fumes of the chloride of tin cease to be formed, and the green chlorine gas appears in the glass tube. The operation is then suspended by removing the pipe *f* from the cylinder or chamber *a*, and a second chamber, of precisely the same construction, may be provided, to which, after having been charged with tin scraps, the pipe *f* may be attached, thus enabling the operation to progress without intermission or appreciable loss of time.

The lid of the chamber *a* is then removed, the perforated cylinder and scraps of tin hoisted out, and, after recharging, the operation is repeated. If the process has been carried out as described, the iron is perfectly freed from tin, and is annealed by the chemical heat to which it has been subjected.

The removal of the tin is effected without burning or oxidizing the iron, which is left in a perfect condition to be employed for any purpose, but especially for the manufacture of steel.

The chloride of tin, one of the products of this process, is of special value to dyers and calico printers, and in other technical branches; but, if desired, it can be readily decomposed, and the tin reduced to the metallic state.

Having described my invention,

What I claim, and desire to secure by Letters Patent, is—

1. The process of removing the tin from "waste tin scraps" by treating the same in an enclosed vessel with chlorine gas, and then carrying off and condensing the vapor or fumes arising from the chemical union of the gas with the tin coating, substantially as set forth.

2. The herein-described apparatus for carrying out the process above specified.

In testimony whereof I have signed my name to this specification before two subscribing witnesses.

DUBOIS D. PARMELEE.

Witnesses:
 WILLIS B. MARVIN,
 JAMES M. RING.